Aug. 7, 1956  G. A. LYON  2,757,975
WHEEL COVER
Filed Dec. 2, 1952  2 Sheets-Sheet 1
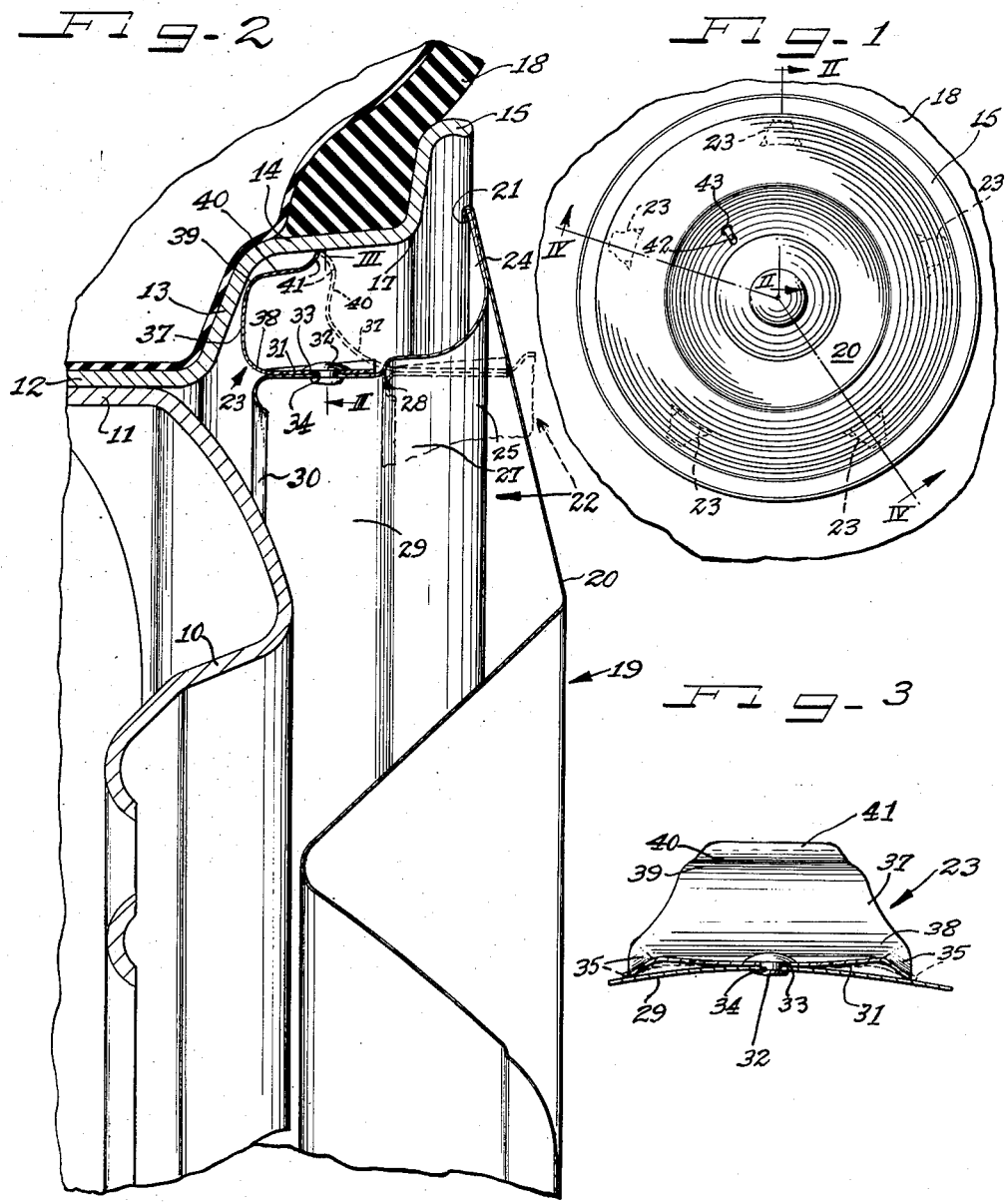
Inventor
George Albert Lyon
by Hill, Sherman, Meroni, Gross & Simpson Attys Aug. 7, 1956  G. A. LYON  2,757,975
WHEEL COVER
Filed Dec. 2, 1952  2 Sheets-Sheet 2
Fig-4
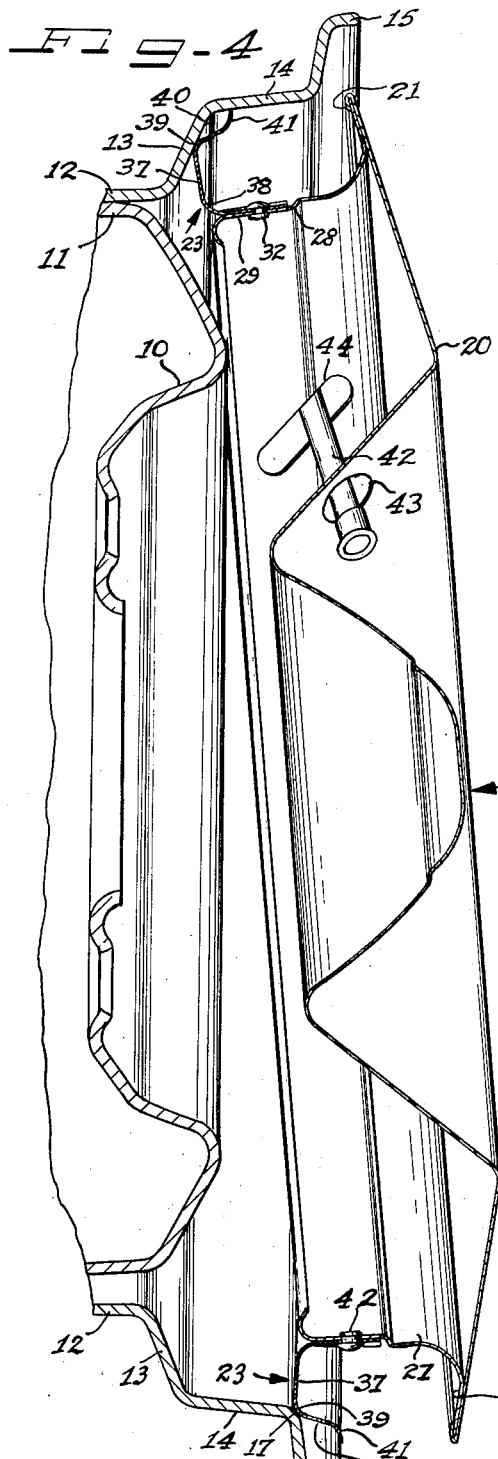
Fig-5
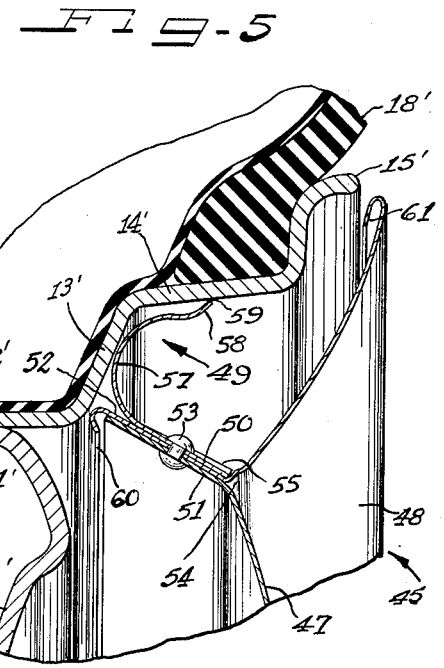
Fig-6
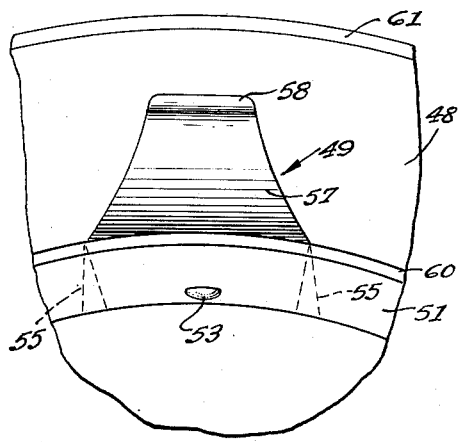
Inventor
George Albert Lyon
by 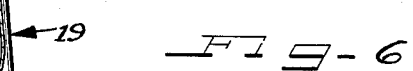 Attys United States Patent Office 2,757,975
Patented Aug. 7, 1956

2,757,975
WHEEL COVER

George Albert Lyon, Detroit, Mich.

Application December 2, 1952, Serial No. 323,628

14 Claims. (Cl. 301—37)

The present invention relates to improvements in wheel structures and more particularly concerns the ornamental and protective covering of the outer side of vehicle wheels.

An important object of the present invention relates to the provision of an improved cover structure for self-retaining interengagement with a part of a vehicle wheel to which the cover may be applied.

Another object of the invention resides in the provision of improved cover retaining clip means.

Still another object of the invention is to provide an improved composite cover construction.

A further object of the invention is to provide an improved cover for disposition at the outer side of a vehicle wheel in press-on, pry-off relation.

Yet another object of the invention is to provide a novel wheel cover that is self-centering when applied to the wheel even though in the process of application the cover may initially be directed into place in a cocked manner.

Other objects, features and advantages of the present invention will be readily apparent from the following detailed description of certain preferred embodiments thereof taken in conjunction with the accompanying drawings in which:

Figure 1 is a side elevational view of a vehicle wheel embodying features of the present invention;

Figure 2 is a fragmentary radial sectional detail view on an enlarged scale taken substantially on the line II—II of Figure 1;

Figure 3 is a fragmentary sectional detail view taken substantially on the line III—III of Figure 2;

Figure 4 is an enlarged diametrical sectional view taken on substantially the line IV—IV of Figure 1, but showing the cover in process of being applied to the wheel;

Figure 5 is a radial sectional view through a modified construction; and

Figure 6 is a fragmentary rear elevational view of the cover of Figure 5 showing one of the retaining spring fingers.

A wheel with which the present invention may be used comprises a disk-spider wheel body 10 made as a stamping from suitable gauge sheet metal and having an outer marginal flange 11 by which it is attached to a base flange 12 of a tire rim. The tire rim may be of the usual rolled section, multi-flange drop center type having a side flange 13 merging with a generally axially outwardly extending and slightly radially outwardly slanting intermediate flange 14 which joins an outer terminal flange 15 at a rounded juncture shoulder 17. The tire rim flanges cooperate to support a pneumatic tire and tube assembly 18.

For covering the outer side of the wheel, a cover 19 is provided which is preferably of a magnitude and extent to substantially cover the entire outer side of the wheel including the wheel body and the tire rim and for this purpose comprises what may be termed a full disk cover. Accordingly, the cover comprises a principal or outer body plate 20 preferably comprising a sheet metal stamping formed from stainless steel or brass or other appropriate material. The body plate member is appropriately shaped and has a peripheral underturned reenforcing and finishing flange 21 defining its perimeter which is of a diameter to lie within the extremity portion of the terminal flange 15.

For retaining the cover 19 on the wheel, means are provided at the margin of the cover member 20 for engaging in press-on, pry-off relation with the tire rim. To this end, an annular flange structure 22 is provided behind the outer margin of the cover member 20 and carries an annular series of spaced retaining fingers 23 engageable with the tire rim.

In a preferred form, the flange structure 22 comprises a separately formed flange member that may be rolled to shape and is attached to the cover plate member 20 as by means of the turned marginal flange 21. Accordingly, the flange member 22 comprises an outer marginal flange portion 24 which is backed up in complementary relation against the inner side of the margin of the cover member 20 and is clamped in place by the underturned marginal flange 21. From the flange portion 24, the flange member extends angularly generally radially and axially inwardly in substantial clearance relation to the tire rim. Accordingly, the member 22 has an annular portion 25 that extends divergently relative to the adjacent portion of the cover member 20 generally radially and axially inwardly from the inner edge of the flange member portion 24 and joins a generally axially inwardly extending annular, angularly related portion 27. A narrow generally radially inwardly extending angular, annular offsetting shoulder 28 facing generally axially inwardly joins the flange portion 27 to an inner marginal flange portion 29 which preferably extends generally axially inwardly and has a reenforcing generally radially inwardly turned short reenforcing and finishing terminal flange 30. By virtue of the multi-angle cross section of the flange member 22, it is substantially rigid. It will be appreciated that since the flange member 22 is completely hidden behind the margin of the cover member 20, comparatively inexpensive sheet metal of suitable gauge may be used in making the flange member.

The flange portion 29 serves as support against which base portions 31 of the generally U-shaped retaining clip fingers 23 seats in the assembly. Each of the base portions 31 is preferably of a length at least about the same as the width of the flange portion 29 so that when fully seated on the flange portion within the reentrant corner provided by the shoulder 28, the base portion of the clip will extend to about the inwardly curved terminal flange 30. Attachment of the base portion 31 to the outer side of the flange portion 29 may be effected conveniently by means of a rivet 32 extending through an aperture 33 in the clip base portion and a registering aperture 34 in the flange portion 29.

By preference, the base portions 31 are of substantial width (Figure 3) and initially preferably flat. Therefore, in order to compensate for the curvature of the supporting flange portion 29 and assure that the base portions 31 will not wobble, the side margins of the base portions 31 are turned angularly generally radially inwardly but slanting divergently toward the respective opposite sides to provide wing-like thrust flanges 35, the edges of which engage tightly against the surface of the flange portion 29 when the centrally located attachment rivet 32 draws the clip base under slightly bowed tension fixedly against the supporting flange portion 29. By reason of the flexible character of the material of the retaining finger, the thrust flanges 35 will also be under tension by virtue of slight flexure as the clip base is drawn under resilient flexure or tension against the supporting flange portion 29. Any tendency for the clip base 31 to turn about the axis of the rivet 32 is prevented by close proximity of the end of the clip base 31 to the opposing shoulder 28 and more especially the adjacent ends of the angular thrust flanges 35.

From the base 31 of each of the retaining clip fingers 23 extends a resilient leg 37 which projects generally radially outwardly from rounded juncture at 38 with the end portion of the base 31 that extends beyond the terminal flange of the supporting flange member. As best seen at the top of Figure 4, the finger leg portion 37 in the initial, unstressed condition thereof preferably slants slightly axially inwardly from its angular juncture with the finger base. The distal end portion of the finger leg 37 extends angularly from a rounded juncture 39 with the body of the leg 37 to provided a generally axially outwardly and radially outwardly directed flange 40 having a relatively short and stiff generally radially outwardly angled retaining terminal flange or tip portion 41. In the unstressed condition of the retaining clips 23, the tips of the terminals 41 extend to a diameter which is larger than the diameter of the radially inner face of the intermediate flange 14 of the tire rim, at least in that portion of the tire rim which is disposed axially inwardly from the shoulder 17 of the tire rim.

As will be observed from Figure 3, the leg portions 37 of the retaining clips are tapered from the wide base 31 thereof to the tip portion 41 so as to improve the flexibility of the leg portion of the clip. This tends to equalize the flexure pressure or tensioning of the clip from its tip toward the base in a transverse sense and assures progressively greater resilient resistance to flexure from the tip portion to the base. A high degree of resiliency is further assured by making the retaining fingers 23 from a suitable gauge hard spring steel, the gauge of the steel being selected for efficient operation under the particular service conditions to which the springs will be subjected, taking into account such factors as the size and weight of the cover to be supported and the rigors of service to which the cover will be exposed.

In applying the cover 19 to the wheel, the spring retaining fingers 23 adapt the wheel cover to be pressed axially inwardly into position on the wheel. While ideally the cover may initially be applied with the terminal portions 41 of the retaining fingers overlying the shoulder 17 of the tire rim and then uniformly axially inwardly pressing the cover to cause the retaining tips of the terminals 41 to cam inwardly along the intermediate flange 14 until the cover has been fully applied, the particular construction of the cover may make it desirable or necessary to apply the cover initially in canted or cocked relation to the wheel substantially as shown in Figure 4 in order to receive a valve stem member 42 through aligned apertures 43 and 44 in respectively the cover member 20 and the flange member 22. In the latter instance, the loop-like portions of the retaining finger or fingers 23 on that portion of the cover which is canted toward the wheel will engage against the side flange 13 of the tire rim, with the edge of the retaining terminal portion or portions 41 of such finger or finger members engaging against the tire rim intermediate flange 14 at an axially inner portion of the intermediate flange relative to where the terminal edges of the finger or fingers will ultimately engage the intermediate flange when the cover is fully in place on the wheel.

As best seen at the top of Figure 4, the shoulder 39 on the retaining finger loop makes initial camming fulcruming contact with the side flange 13. Then as the opposite side of the cover is swung toward the wheel (see bottom of Figure 4), the spring retaining finger loop body portion 37 at the shoulder 39 or the immediately adjacent portion of the loop body portion 37 of the finger 23 at that side of the cover engages against the tire rim shoulder 17. Initially this occurs with the finger leg extending in the more or less axially inwardly biased direction shown while the finger is relatively unstressed.

As pressure is exerted in generally axially inward direction to continue the inward swinging of the outwardly canted portion of the cover, the retaining spring finger leg 37 flexes under resilient stress in axially outward direction to enable camming of the finger inwardly past the shoulder 17. This, of course, places the retaining finger or fingers opposite to the now heavily stressed retaining fingers on the in-moving side of the cover under substantial tension in both an axial and a radial direction toward the side and intermediate flanges of the tire rim. Moreover, as the cover swings in, the retaining finger or fingers 23 on the canted-in portion of the cover gradually swing toward final assembly. As a result, the finger shoulders 39 which engage the side flange 13 are caused to slidingly fulcrum radially outwardly along the incline of the side flange and also rock on the tire rim side flange and swing the leg portions 40 of the fingers gradually axially outwardly and radially outwardly. This effects gradually axially outward sliding of the tips of the stiff finger terminals 41 of such clip or clips generally axially outwardly along the intermediate flange 14 until the axially inwardly moving retaining fingers at the opposite in-moving side of the cover are pressed home to engagement of the leg loops thereof against the side flange 13 of the tire rim.

When the cover has been pressed fully home all of the retaining fingers 23, which as shown in Figure 1 may be five fingers symmetrically spaced, mutually cooperate as backed up by the flange portion 29 supporting the same to support the cover in fully centered relation to the wheel and in cushioned spaced relation to the wheel. The resiliently tensioned reaction of the retaining fingers causes the bight or loop portions of the resilient legs thereof adjacent the side flange 13 to tend to spring away slightly from the side flange as indicated in Figure 2, but each of the retaining fingers is under strong resilient tension reacting against the retaining edges of the terminal portions 41 to effect a strong gripping, thrusting, biting engagement with the tire rim intermediate flange 14 and at the same time very effectively resisting axially outward displacement of the cover. It will be observed on comparison of Figure 2 with the upper portion of Figure 4, that as a result of the resilient tensioning flexure of the finger legs the body portions 37 assume a bowed condition instead of a straight initial form. Furthermore, the particular construction of the retaining fingers assures that all of the retaining tips will be in equalized engagement with the intermediate flange 14 considered with respect to the axially intermediate portion of the intermediate flange or, stated another way, the annular line engaged by the tips, thus assuring full self-centering of the cover on the wheel through the spring retaining finger engagement of the intermediate flange.

By having the cover supported in fully spaced relation to all parts of the wheel, the retaining spring fingers 23 are enabled to absorb either axial or transverse shocks or vibrations that may be encountered in service. Furthermore, the spacing of the cover parts from the tire rim enables circulation of air between the marginal structure of the cover and through the customary wheel openings between the wheel body 10 and the tire rim base flange 12.

It should be noted that a further advantage of having the sides of the retaining finger base portions 31 provided with the angular resilient thrust flanges 35 resides in that when the retaining fingers are placed under extreme stress, as for example when the cover is being applied to the wheel, or in the event of very severe transverse pressure against the cover while it is on the wheel, the side flanges 35 afford resilient stress relief. This comes about because of the substantial width of the base portions 31 and the juncture with the flexible leg portion which is substantially as wide as the base portion as best seen in Figure 3, and the running out of the adjacent end portions of the side flanges 35 at the juncture. Hence when the leg portions are placed under extreme tension some of the tension is transmitted to the side portions of the finger bases and absorbed by the side flanges 35 which tend under the resilient pressure to flex and spread apart as indicated more or less schematically in dash outline in Figure 3. As a result, the spring legs 37 of the fingers and more particularly the junctures 38 are protected against overstressing and possibly taking a set.

Where it is desired to remove the cover 19 from the wheel, a pry-off tool such as a screw driver may be applied in the gap between the tire rim terminal flange 15 and the multi-layer reenforced margin of the cover behind the turned flange 21 and axially outward leverage applied to the margin of the cover and then the retaining flange member 22. The retaining spring finger or fingers 23 will resiliently resist the pry-off pressure. However, continued affected application of the pry-off pressure, eventually including against the shoulder 28, will effect yielding of the adjacent retaining fingers by resilient generally outward flexure of the retaining finger leg portions 37 adjacent the point of pry-off and radially compressive flexure of the retaining finger loop portions at the opposite side of the cover by virtue of slight radial movement of the cover as an incident to elongation of the leg or legs 37 of the clip or clips which are being flexed outwardly adjacent the point of pry-off. Then, as the pry-off force is continued, the retaining finger or fingers adjacent the point of pry-off will flex outwardly sufficiently to fulcrum the retaining edge or edges thereof into reverse relative to the engaged portion of the intermediate flange 14, substantially as indicated in dash outline in Figure 2 so that continued pry-off pressure will cause the retaining fingers to slide axially outwardly along the intermediate flange until the cover is released. The retaining fingers then snap to their initial, unflexed condition ready to resume their resiliently tensioned retaining engagement with the tire rim when the cover is replaced on the wheel.

It will be apparent that during the reversal flexure of the finger legs 37 during pry-off, the portions of the fingers adjacent the turned extremity flange 30 may flex slightly radially inwardly and back up against such turned flange.

In the modification of Figures 5 and 6, a cover 45 is provided which preferably comprises a composite structure including a central crown portion 47 assembled with a trim ring annular portion 48 and provided with a juncture or assembly flange structure carrying a series of resilient spring clip retaining fingers 49 by which the cover is adapted to be self-retainingly attached in self-centering relation to a wheel which is substantially the same as the wheel of Figures 2 and 4 and is identified in its several elements by similar but primed reference numerals.

By preference, each of the spring fingers 49 comprises a base end flange portion 50 of substantial width adapted to be attached to the cover. To this end, the outer margin of the cover crown portion 47 has a generally radially outwardly and axially inwardly tapering marginal flange 51 against which a complementary inner marginal flange 52 of the trim ring cover member 48 engages. The base flange 50 of each of the fingers engages against the radially outwardly facing side of the flang 52 and is secured thereagainst in generally axially inwardly and radially outwardly sloping position behind the trim ring member 48 as by means of a rivet 53 similarly as the fingers 23. At its extremity the base portion 50 extends into the reentrant corner between the marginal flange 52 and the body of the trim ring portion 48 of the cover provided with a juncture shoulder 54. This retains the fingers 49 against turning about the axis of the rivet 53. The rivets 53 also secure the cover flange 51 to the inner side of the flange 52.

In order to assure a snug engagement of the finger base 50 against the cover flange assembly to which attached, and especially tight engagement of the side margins of the base with the cover flange 52, although the finger base is of considerable width and the flange is curved, the side margins of the base are angled to provide wing-like thrust flanges 55. In the normal condition of the base 50 prior to attachment to the cover, the major portion of the base intermediate the side thrust flanges 55 is preferably flat. When the finger base 50 is secured by the rivet 53 to the flange assembly, the intermediate portion of the base is drawn inwardly toward the supporting flange structure of the cover and this places the base flange under substantial resilient tension by reason of the intermediate draw-up toward the cover flange. The thrust flanges 55 then grip in strong inward thrusting relation against the supporting flange structure.

From the base flange 50, the clip projects generally radially outwardly in a spring leg 57 of generally arcuate loop shape with the outer portion of the spring leg extending generally axially outwardly and terminating in a short and relatively stiff generally radially outwardly angled retaining terminal flange 58 having an edge 59 engageable in radially outwardly thrusting retaining gripping engagement with the intermediate flange 14' of the tire rim.

For reenforcement and finishing thereof, the inner extremity of the finger supporting flange 52 of the trim ring portion of the cover is preferably turned inwardly to provide a reenforcing and finishing flange 60. For similar reasons the outer edge portion of the trim ring member 48 is turned under to provide a reenforcing and finishing flange 61 which lies in assembly with the wheel adjacent to the extremity of the terminal flange 15' of the tire rim.

In applying the cover 45 to the wheel, the terminal portions 58 of the retaining clip fingers 49, which normally extend to a greater diameter than the inside diameter of the intermediate flange, may be disposed against the shoulder 17' of the tire rim and the cover pressed axially inwardly. On the other hand, one or two of the retaining fingers 49 may be disposed with the loop leg portions 57 thereof in engagement with the side flange 13' of the tire rim by canting the cover toward the wheel, and with the engagement tips 59 of such finger or fingers engaging the intermediate flange 14. Then, the cover is pressed axially inwardly by swinging the same toward concentric relation with the wheel so that the remaining retaining fingers 49 are cammed inwardly along the intermediate flange 14'. As this occurs, the tips 59 of the one or two first engaged fingers will gradually work axially outwardly as the finger loops 57 shoulder and lever against the side flange 13'. Thus, all of the fingers 49 are placed under resilient inward deflection and flexure so that the tips 58 of the fingers engage in strong thrusting gripping, biting retaining relation against the intermediate flange 14' to retain the cover against unintentional outward displacement.

Removal of the cover from the tire rim can be accomplished by insertion of a pry-off tool behind the outer trim ring portion 48 of the cover in the gap between the reenforced edge 61 of the cover and the terminal flange and application of pry-off leverage against the inner side of the cover to effect disengagement of the fingers 49 from the tire rim, similarly as described for the fingers 23.

By having the retaining fingers 49 provided with wide base portions and the loop portions 57 thereof tapering toward narrower tip at the terminal flange portion 58 thereof, progressively increasing resilient tensioning of the fingers from the tips thereof to the base portions 50 is accomplished. Furthermore, by having the finger base portions 50 tensioned and held against any possibility of canting sidewise looseness relative to the supporting flange assembly of the cover is avoided.

It will be observed that the finger extensions 49, similarly as the finger extensions 23, support the cover in substantially floating, resiliently cushioned, spaced relation to the wheel.

It will be understood that modifications and variations may be effected without departing from the scope of the novel concepts of the present invention.

I claim as my invention:

1. In a wheel structure including a multi-flange tire rim having a base flange and an intermediate flange, a cover for disposition at the outer side of the intermediate flange having a generally axially inwardly extending flange portion spaced radially inwardly from said intermediate flange, said flange portion having thereon a series of retaining finger extensions including generally U-shaped resilient portions having the bight sections thereof opposing said intermediate flange and including generally axially outwardly directed finger legs to lie in radially inwardly spaced relation to the intermediate flange and with terminal short and stiff flanges directed generally radially outwardly angularly to said legs and having edges in retaining gripping engagement with the intermediate flange.

2. In a wheel structure including a multi-flange tire rim having an intermediate flange, a cover for disposition at the outer side of the wheel and comprising a cover member having a generally axially inwardly extending flange in radially inwardly spaced relation to said intermediate flange, and a series of retaining spring fingers of generally U-shape on said cover flange and projecting into the space between said intermediate flange and the cover flange, said retaining fingers having generally axially outwardly extending terminal legs provided with generally radially outwardly angled short and stiff retaining terminals for endwise retaining gripping engagement with the intermediate flange.

3. In a cover member for disposition at the outer side of a vehicle wheel, a cover plate, a rigid flange member secured to said cover plate and having an inner marginal flange portion projecting therebehind, said flange member having an angular shoulder in said inner marginal flange portion, and a series of retaining spring fingers on said flange portion projecting as extensions therefrom for retaining engagement with a portion of a wheel and having butt ends cooperating in anti-turning relation with said shoulder.

4. In a cover for disposition at the outer side of a vehicle wheel, a cover member having a generally axially inwardly extending flange, and a retaining finger carried by said flange and having a base portion secured to said flange and a resilient leg loop projecting generally radially outwardly for engagement with a tire rim flange, said base portion being initially generally dished in opposition to the opposing portion of the cover flange and drawn up toward and secured under resilient tension against said cover flange.

5. In a cover for disposition at the outer side of a vehicle wheel, a cover member having a generally axially extending flange, and a retaining finger secured to said flange and having a base portion of substantial width with angled thrust flanges at the sides thereof, said base portion being drawn up under tension against said cover flange intermediate said thrust flanges with the thrust flanges thrusting against said cover flange.

6. In a cover for disposition at the outer side of a vehicle wheel, a cover body structure having a flange projecting generally axially inwardly, and a substantially U-shaped spring finger clip for attaching the cover to a wheel, said clip comprising a base portion of substantial width and a cover retaining leg loop portion projecting generally radially therefrom, said base being of substantially greater width than the loop portion and said loop portion progressively diminishing in width to the tip of the clip, the tip portion of the clip comprising an angular radially short and stiff terminal retaining flange.

7. In a wheel structure including a wheel body and a multi-flange tire rim joined thereto and having outer side and intermediate flanges angled away from juncture of the wheel body and tire rim, a cover for disposition at the outer side of the wheel comprising a plate for substantially concealing disposition with respect to the outer side of the wheel and provided with a generally axially inwardly directed flange therebehind disposed to lie in assembly substantially opposite juncture of the tire rim and wheel body and thereby providing a substantial space between said flange and the intermediate flange of the tire rim, and a plurality of spring retaining clips for retaining the cover on the wheel disposed in spaced relation about the flange and having base portions secured to the flange and generally U-shaped resilient leg portions including a generally radially outwardly extending portion to lie opposite the side flange of the tire rim and a generally axially outwardly directed terminal leg portion to lie in spaced relation to the adjacent portion of the intermediate flange with a generally radially and axially outwardly directed short and stiff terminal retainingly engaging the intermediate flange and thereby retaining the cover on the wheel.

8. A wheel structure as defined in claim 7 wherein said flange comprises a generally L-shaped member having a generally radially outwardly extending outer leg secured behind the cover plate and a generally axially inwardly extending flange portion to which said clips are secured.

9. A wheel structure as defined in claim 7 wherein said cover plate is formed in two circular portions secured together and providing said flange at their juncture substantially opposite the juncture of the wheel body with the tire rim.

10. In a wheel structure including a wheel body and a tire rim with a generally axially outwardly extending flange on the tire rim providing a radially inwardly facing substantially straight face in axial direction, a cover for the outer side of the wheel comprising a circular cover member having behind the radially outer portion thereof an inwardly directed flange, and a plurality of circumferentially spaced cover retaining fingers on said flange comprising generally axially outwardly directed resilient finger legs disposed to lie in closely adjacent but spaced relation to the flange of the tire rim and having short and stiff generally radially outwardly and axially outwardly oblique retaining terminals engageable endwise with said rim flange under resilient deflectional tension of said finger legs to grip the rim flange in cover retaining press-on, pry-off relation.

11. In a wheel structure including a wheel body and a tire rim with a generally axially outwardly extending flange on the tire rim providing a radially inwardly facing substantially straight face in axial direction, a cover for the outer side of the wheel comprising a circular cover member having behind the radially outer portion thereof an inwardly directed flange, and a plurality of circumferentially spaced cover retaining fingers on said flange comprising generally axially outwardly directed resilient finger legs disposed to lie in closely adjacent but spaced relation to the flange of the tire rim and having short and stiff generally radially outwardly and axially outwardly oblique retaining terminals engageable endwise with said rim flange under resilient deflectional tension of said finger legs to grip the rim flange in cover retaining press-on, pry-off relation, said fingers additionally including generally axially inwardly facing resilient shoulders which are engageable against a generally axially outwardly facing flange of the tire rim at the axially inner side of said radially inwardly facing rim flange when the cover is pressed all the way axially inwardly onto the wheel to serve as limiting stops upon the axially inward disposition of the cover and thereby assuring proper location of the entire cover in axial direction when pressing the cover into position.

12. In a wheel structure including a tire rim having a side flange facing generally axially outwardly and an intermediate flange projecting generally axially and radially outwardly therefrom and facing radially inwardly, a cover for disposition at the outer side of the wheel including a portion to lie in substantially concentric radially inwardly spaced relation from said intermediate flange and having thereon a series of circumferentially spaced resilient retaining fingers extending generally radially therefrom and having generally return bent generally axially outwardly extending retaining finger legs spaced radially outwardly from said cover portion and spaced radially inwardly from the intermediate flange and radially resiliently deflectable relative to both the cover and the intermediate flange, said legs having short and stiff radially and axially outwardly angled retaining terminals engageable at their tips in retaining gripping press-on, pry-off relation with said intermediate flange, the terminal tips normally lying to a greater diameter than the diameter of the engageable portion of the intermediate flange and thereby being radially inwardly deflected by the retaining engagement with the intermediate flange and thus placing said legs under resilient radially inwardly deflected tension, said cover portion and said retaining fingers being disposed in assembly in confronting relation to the side flange of the tire rim.

13. In a wheel structure including a tire rim having a side flange facing generally axially outwardly and an intermediate flange projecting generally axially and radially outwardly therefrom and facing radially inwardly, a cover for disposition at the outer side of the wheel including a portion to lie in concentric radially inwardly spaced relation from said intermediate flange and having thereon a series of circumferentially spaced resilient retaining fingers extending generally radially therefrom and having generally return bent generally axially outwardly extending retaining finger legs in assembly spaced radially outwardly from said cover portion and spaced radially inwardly from the intermediate flange and radially resiliently deflectable relative to both the cover and the intermediate flange, said legs having short and stiff radially and axially outwardly angled retaining terminals engageable at their tips in retaining gripping press-on, pry-off relation with said intermediate flange, the terminal tips normally lying to a greater diameter than the diameter of the engageable portion of the intermediate flange and thereby being radially inwardly deflected by the retaining engagement with the intermediate flange and thus placing said legs under resilient radially inwardly deflected tension, said cover portion and said retaining fingers being disposed in assembly in confronting relation to the side flange of the tire rim, each of said retaining fingers having a base portion of substantial width confronting said cover portion in face-to-face relation, with a rivet securing said base portion to the cover portion.

14. In a wheel structure including a tire rim having a generally radially inwardly facing and axially extending annular intermediate flange extending from a generally axially outwardly facing and radially inwardly directed side flange, a cover disposed at the outer side of the wheel including an annular portion overlying the tire rim and having a generally axially inwardly and radially inwardly directed circular part for spaced disposition opposite the side and intermediate flanges of the tire rim, and retaining spring clips carried by said circular cover part and each provided with a resilient leg extending generally axially outwardly and being radially deflectable in the space between the cover part and said intermediate flange and having at its axially outer extremity a generally radially outwardly angled terminal having an edge terminus retainingly engageable in gripping retaining relation against the intermediate flange in press-on pry-off relation with the leg radially inwardly tensioned towards said cover part.

References Cited in the file of this patent

UNITED STATES PATENTS

| | | |
|---|---|---|
| Re. 19,467 | Lyon | Feb. 12, 1935 |
| 2,368,228 | Lyon | Jan. 30, 1945 |
| 2,386,228 | Lyon | Oct. 9, 1945 |
| 2,397,360 | Lyon | Mar. 26, 1946 |
| 2,421,756 | Lyon | June 10, 1947 |
| 2,570,255 | Lyon | Oct. 9, 1951 |